US012747314B2

(12) United States Patent
Suzuki et al.

(10) Patent No.: US 12,747,314 B2
(45) **Date of Patent: *Sep. 29, 2026**

(54) SURFACE TREATMENT AGENT FOR OPHTHALMIC DEVICE

(71) Applicant: NOF CORPORATION, Tokyo (JP)

(72) Inventors: Hirotaka Suzuki, Kawasaki (JP); Shunsuke Ozaki, Kawasaki (JP); Norio Iwakiri, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 655 days.

This patent is subject to a terminal disclaimer.

(21) Appl. No.: 18/039,567

(22) PCT Filed: Nov. 24, 2021

(86) PCT No.: PCT/JP2021/042907

§ 371 (c)(1),
(2) Date: May 31, 2023

(87) PCT Pub. No.: WO2022/118701

PCT Pub. Date: Jun. 9, 2022

(65) Prior Publication Data

US 2024/0010777 A1 Jan. 11, 2024

(30) Foreign Application Priority Data

Dec. 1, 2020 (JP) ................................ 2020-199792

(51) Int. Cl.

| | |
|---|---|
| ***G02C 7/04*** | (2006.01) |
| ***C08F 220/36*** | (2006.01) |
| ***C08L 83/04*** | (2006.01) |
| ***C09D 183/04*** | (2006.01) |
| ***G02B 1/04*** | (2006.01) |

(52) U.S. Cl.
CPC .............. *C08F 220/36* (2013.01); *G02C 7/04* (2013.01)

(58) Field of Classification Search
None
See application file for complete search history.

(56) References Cited

U.S. PATENT DOCUMENTS

| | | | | |
|---|---|---|---|---|
| 2016/0083610 | A1 | 3/2016 | Lin et al. | |
| 2018/0244911 | A1 * | 8/2018 | Iso | C11D 3/37 |
| 2024/0117094 | A1 * | 4/2024 | Suzuki | G02B 1/043 |

FOREIGN PATENT DOCUMENTS

| | | | |
|---|---|---|---|
| EP | 3 851 900 | A1 | 7/2021 |
| JP | 2007-197513 | A | 8/2007 |
| JP | 2011-052055 | A | 3/2011 |
| WO | 2013/070306 | A1 | 5/2013 |

OTHER PUBLICATIONS

Machine translation of JP 2011-052055 A (no date).*
International Search Report for PCT/JP2021/042907, dated Feb. 8, 2022.

* cited by examiner

*Primary Examiner* — Michael J Feely
(74) *Attorney, Agent, or Firm* — Sughrue Mion, PLLC

(57) ABSTRACT

Provided is a surface treatment agent for an ophthalmic device that can impart wettability and lubricity to the surface of a silicone hydrogel, more specifically, a surface treatment agent for an ophthalmic device that can subject the silicone hydrogel to surface treatment even when the silicone hydrogel is not caused to present any specific complementary functional group. Also provided are a surface-treated silicone hydrogel whose surface has been treated with the surface treatment agent for an ophthalmic device, and an ophthalmic device using the surface-treated silicone hydrogel. It has been found that the above-mentioned objects can be achieved by using a water-soluble copolymer obtained by copolymerizing a phosphorylcholine group-containing monomer, a specific silicone monomer, and a thermally reactive monomer or a photoreactive monomer, the copolymer having water solubility controlled to a specific level. Thus, the present invention has been completed.

13 Claims, No Drawings

SURFACE TREATMENT AGENT FOR OPHTHALMIC DEVICE

CROSS REFERENCE TO RELATED APPLICATIONS

This application is a National Stage of International Application No. PCT/JP2021/042907 filed Nov. 24, 2021, claiming priority based on Japanese Patent Application No. 2020-199792 filed Dec. 1, 2020.

TECHNICAL FIELD

The present invention relates to a surface treatment agent for an ophthalmic device treated with a silicone-containing water-soluble copolymer, which is capable of being fixed to a surface of an ophthalmic device, such as a contact lens, an intraocular lens, or an artificial cornea, in production of the device.

The present application claims priority from Japanese Patent Application No. 2020-199792, which is incorporated herein by reference.

BACKGROUND ART

A silicone hydrogel contact lens has markedly high oxygen permeability as compared to a conventional contact lens, and hence has a large amount of oxygen supply to the cornea and can alleviate strain on the ocular tissue. The silicone hydrogel contact lens is becoming a mainstream contact lens prescribed in recent years, and is expected to gain increasingly widespread use in the future.

Meanwhile, the silicone hydrogel lens has a low water content and high hydrophobicity, and hence has had a disadvantage of being liable to repel tears and being liable to have lipid contamination. In addition, in recent years, it has been reported that friction between the eyelid conjunctival margin and the ocular surface at the time of blinking causes epithelial cells of the surface layer of the eyelid conjunctiva to be shed and degenerated (Non Patent Literature 1 and Non Patent Literature 2). Accordingly, it is desired that lubricity as well as hydrophilicity be imparted to the silicone hydrogel lens. For that purpose, various measures have been investigated in order to improve the hydrophilicity and lubricity of the surface of the silicone hydrogel lens.

For example, it is widely performed to incorporate a plasma treatment step of a lens into the production steps of a contact lens. The plasma treatment has an advantage in that relatively high hydrophilicity and durability thereof can be imparted, but has disadvantages in that lubricity cannot be imparted, and that large-scale capital investment is required.

A method including adding a wet component, such as a hydrophilic monomer such as N-vinylpyrrolidone or polyvinyl alcohol, to a lens monomer composition has been known as a method that does not require any large-scale capital investment. The advantage of the method lies in that the addition of the wet component to a lens before its molding can omit a post-treatment step for wetting the lens. However, the compatibilization of the wet component having high hydrophilicity with the monomer composition containing a silicone component having high hydrophobicity involves limitations on lens monomer composition. Accordingly, the development of a technology applicable to a wider range of lens composition has been required.

A method including coating the surface of a lens with a wet component has been known. A hydrophilic polymer has been generally used as the wet component for coating, and in particular, it has been known that a polymer using 2-methacryloyloxyethyl phosphorylcholine (hereinafter abbreviated as "MPC"), which is a zwitterionic functional group, is excellent in hydrophilicity- and lubricity-imparting effects.

In Patent Literature 1, there is a disclosure of the coating of a silicone hydrogel contact lens with a MPC polymer. However, in the method described in Patent Literature 1, two polymer layers need to be sequentially formed on the surface of a silicone hydrogel, and hence a process is complicated.

In Patent Literature 2, there is a disclosure of a method including applying a MPC polymer containing a reactive functional group to a silicone hydrogel lens having a complementary group that forms a pair with the reactive functional group to form a coating to be fixed to the surface of the lens in a covalent bond manner. However, the method involves limitations on lens composition to which the method is applicable because both of the MPC polymer and the lens need to be caused to present specific functional groups that are complementary to each other.

In view of the foregoing, the development of a technology applicable to a wider range of lens composition has been required.

CITATION LIST

Patent Literature

[PTL 1] WO 2013/074535 A1
[PTL 2] JP 2017-146334 A

Non Patent Literature

[NPL 1] D. R. Korb et al., 2002, CLAO J., 28, 211-126
[NPL 2] D. R. Korb et al., 2005, Eye & Contact Lens, 31, 2-8

SUMMARY OF INVENTION

Technical Problem

An object of the present invention is to provide a surface treatment agent for an ophthalmic device that can impart wettability and lubricity to the surface of a silicone hydrogel, more specifically, a surface treatment agent for an ophthalmic device that can subject the silicone hydrogel to surface treatment even when the silicone hydrogel is not caused to present any specific complementary functional group.

Another object of the present invention is to provide a surface-treated silicone hydrogel whose surface has been treated with the surface treatment agent for an ophthalmic device, and an ophthalmic device using the surface-treated silicone hydrogel.

Solution to Problem

The inventors of the present invention have made extensive investigations in view of the above-mentioned objects, and as a result, to their surprise, have found that the above-mentioned objects can be achieved by using a water-soluble copolymer obtained by copolymerizing a phosphorylcholine group-containing monomer, a specific silicone monomer, and a thermally reactive monomer or a photoreactive monomer, the copolymer having water solubility controlled to a specific level. Thus, the inventors have completed the present invention.

That is, the present invention is as described below.

1. A surface treatment agent for an ophthalmic device, including a copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

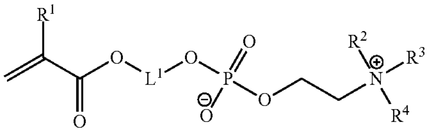

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

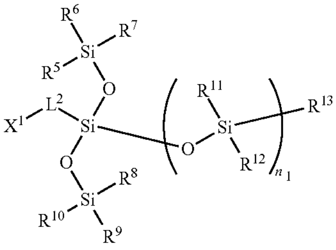

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

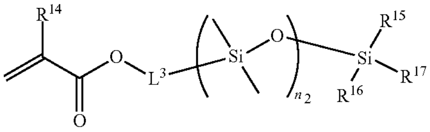

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

2. The surface treatment agent for an ophthalmic device according to Item 1, wherein the thermally reactive monomer or photoreactive monomer is a photoreactive monomer.

3. The surface treatment agent for an ophthalmic device according to Item 1, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is polydimethylsiloxane monomethacrylate, tris(trimethylsiloxy)silylpropyl methacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or photoreactive monomer "c" is methacryloyloxybenzophenone, 4-(4-azidobenzoyloxymethyl)vinylbenzene, or glycidyl methacrylate.

4. The surface treatment agent for an ophthalmic device according to Item 1, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or photoreactive monomer "c" is any one selected from the following:

(1) 2-methacryloyloxyethyl phosphorylcholine, polydimethylsiloxane monomethacrylate, and methacryloyloxybenzophenone;

(2) 2-methacryloyloxyethyl phosphorylcholine, tris(trimethylsiloxy)silylpropyl methacrylate, and methacryloyloxybenzophenone;

(3) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene;

(4) 2-methacryloyloxyethyl phosphorylcholine, 3-(3-(methylbis(trimethylsiloxy)silyl)propyl)glycerol-1-methacrylate, and methacryloyloxybenzophenone;

(5) 2-methacryloyloxyethyl phosphorylcholine, polydimethylsiloxane monomethacrylate, and glycidyl methacrylate;

(6) 2-methacryloyloxyethyl phosphorylcholine, tris(trimethylsiloxy)silylpropyl methacrylate, and glycidyl methacrylate; and (7) 2-methacryloyloxyethyl phosphorylcholine, 4-(2-hydroxyethyl)-2-methylene-1-(tris(trimethylsiloxy)silylpropyl)butane-1,4-dioate, and glycidyl methacrylate.

5. A surface-treated silicone hydrogel, including a surface treated with the copolymer of any one of Items 1 to 4.

6. The surface-treated silicone hydrogel according to Item 5, wherein the copolymer is the copolymer of Item 2, and the surface treatment is photoirradiation.

7. An ophthalmic device, including the surface-treated silicone hydrogel of Item 5 or 6.

8. The ophthalmic device according to Item 7, wherein the ophthalmic device is a soft contact lens.

9. A method of treating a surface of a silicone hydrogel, including a step of treating the surface of the silicone hydrogel with a copolymer, the copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

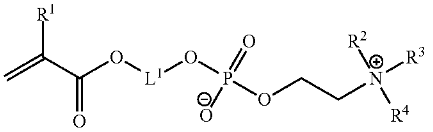

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

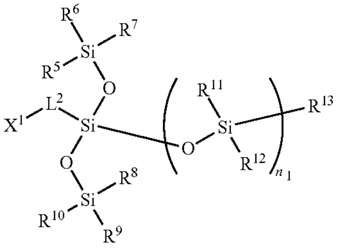

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

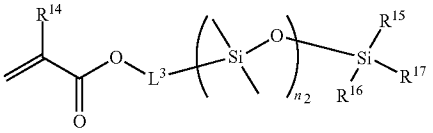

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

10. The method of treating a surface of a silicone hydrogel according to Item 9, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is polydimethylsiloxane monomethacrylate, tris(trimethylsiloxy)silylpropyl methacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or photoreactive monomer "c" is methacryloyloxybenzophenone, 4-(4-azidobenzoyloxymethyl)vinylbenzene, or glycidyl methacrylate.

11. The method of treating a surface of a silicone hydrogel according to Item 9, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or photoreactive monomer "c" is any one selected from the following:

(1) 2-methacryloyloxyethyl phosphorylcholine, polydimethylsiloxane monomethacrylate, and methacryloyloxybenzophenone;

(2) 2-methacryloyloxyethyl phosphorylcholine, tris(trimethylsiloxy)silylpropyl methacrylate, and methacryloyloxybenzophenone;

(3) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene;

(4) 2-methacryloyloxyethyl phosphorylcholine, 3-(3-(methylbis(trimethylsiloxy)silyl)propyl)glycerol-1-methacrylate, and methacryloyloxybenzophenone;

(5) 2-methacryloyloxyethyl phosphorylcholine, polydimethylsiloxane monomethacrylate, and glycidyl methacrylate;

(6) 2-methacryloyloxyethyl phosphorylcholine, tris(trimethylsiloxy)silylpropyl methacrylate, and glycidyl methacrylate; and (7) 2-methacryloyloxyethyl phosphorylcholine, 4-(2-hydroxyethyl)-2-methylene-1-(tris(trimethylsiloxy)silylpropyl)butane-1,4-dioate, and glycidyl methacrylate.

12. A method of producing a surface-treated silicone hydrogel, including a step of applying a copolymer to a surface of a silicone hydrogel, the copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

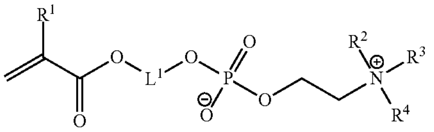

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

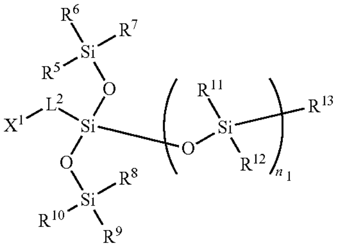

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

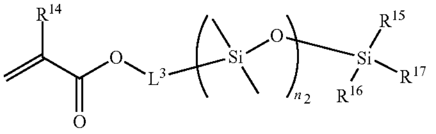

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

13. The method of producing a surface-treated silicone hydrogel according to Item 12, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is polydimethylsiloxane monomethacrylate, tris(trimethylsiloxy)silylpropyl methacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or photoreactive monomer "c" is methacryloyloxybenzophenone, 4-(4-azidobenzoyloxymethyl)vinylbenzene, or glycidyl methacrylate.

14. The method of producing a surface-treated silicone hydrogel according to Item 12, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or photoreactive monomer "c" is any one selected from the following:

(1) 2-methacryloyloxyethyl phosphorylcholine, polydimethylsiloxane monomethacrylate, and methacryloyloxybenzophenone;

(2) 2-methacryloyloxyethyl phosphorylcholine, tris(trimethylsiloxy)silylpropyl methacrylate, and methacryloyloxybenzophenone;

(3) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene;

(4) 2-methacryloyloxyethyl phosphorylcholine, 3-(3-(methylbis(trimethylsiloxy)silyl)propyl)glycerol-1-methacrylate, and methacryloyloxybenzophenone;

(5) 2-methacryloyloxyethyl phosphorylcholine, polydimethylsiloxane monomethacrylate, and glycidyl methacrylate;

(6) 2-methacryloyloxyethyl phosphorylcholine, tris(trimethylsiloxy)silylpropyl methacrylate, and glycidyl methacrylate; and (7) 2-methacryloyloxyethyl phosphorylcholine, 4-(2-hydroxyethyl)-2-methylene-1-(tris(trimethylsiloxy)silylpropyl)butane-1,4-dioate, and glycidyl methacrylate.

15. A use of a copolymer for production of a surface treatment agent for an ophthalmic device, the copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

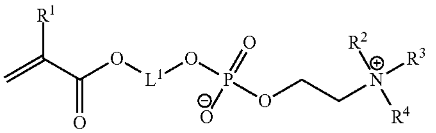

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

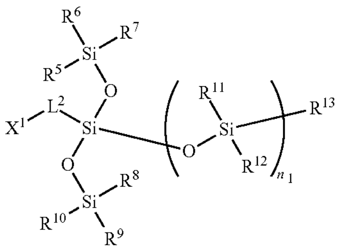

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

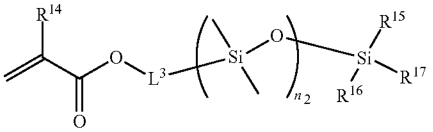

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

16. The use according to Item 15, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is polydimethylsiloxane monomethacrylate, tris(trimethylsiloxy)silylpropyl methacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or photoreactive monomer "c" is methacryloyloxybenzophenone, 4-(4-azidobenzoyloxymethyl) vinylbenzene, or glycidyl methacrylate.

17. The use according to Item 15, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or photoreactive monomer "c" is any one selected from the following:

(1) 2-methacryloyloxyethyl phosphorylcholine, polydimethylsiloxane monomethacrylate, and methacryloyloxybenzophenone;

(2) 2-methacryloyloxyethyl phosphorylcholine, tris(trimethylsiloxy)silylpropyl methacrylate, and methacryloyloxybenzophenone;

(3) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene;

(4) 2-methacryloyloxyethyl phosphorylcholine, 3-(3-(methylbis(trimethylsiloxy)silyl)propyl)glycerol-1-methacrylate, and methacryloyloxybenzophenone;

(5) 2-methacryloyloxyethyl phosphorylcholine, polydimethylsiloxane monomethacrylate, and glycidyl methacrylate;

(6) 2-methacryloyloxyethyl phosphorylcholine, tris(trimethylsiloxy)silylpropyl methacrylate, and glycidyl methacrylate; and (7) 2-methacryloyloxyethyl phosphorylcholine, 4-(2-hydroxyethyl)-2-methylene-1-(tris(trimethylsiloxy)silylpropyl)butane-1,4-dioate, and glycidyl methacrylate.

Advantageous Effects of Invention

The surface treatment agent for an ophthalmic device of the present invention can be used to impart high wettability and lubricity to a silicone hydrogel.

DESCRIPTION OF EMBODIMENTS

The present invention is described below in more detail.

As used herein, the term "(meth)acrylic acid" means "acrylic acid or methacrylic acid," and the same applies to other similar terms.

In addition, herein, when preferred numerical ranges (e.g., the ranges of a content or a weight-average molecular weight) are described in stages, the respective lower limit values and upper limit values may be independently combined with each other. For example, in the description: "preferably from 10 to 100, more preferably from 20 to 90," the "preferred lower limit value: 10" and the "more preferred upper limit value: 90" may be combined to obtain a range of "from 10 to 90."

In addition, examples of an ophthalmic device of the present invention may include, but not particularly limited to, a contact lens, an intraocular lens, and an artificial cornea.

One mode of a copolymer to be incorporated into a surface treatment agent for an ophthalmic device of the present invention (hereinafter sometimes referred to as "copolymer of the present invention") is a copolymer obtained by copolymerizing a hydrophilic monomer "a" represented by the following formula (1), a silicone monomer "b" represented by the following formula (2) or the following formula (3), and a thermally reactive monomer or photoreactive monomer "c" (copolymer containing: a constituent unit based on the hydrophilic monomer "a" represented by the following formula (1); a constituent unit based on the silicone monomer "b" represented by the following formula (2) or the following formula (3); and a constituent unit based on the thermally reactive monomer or photoreactive monomer "c"), the copolymer being capable of dissolving at 0.5% (w/v) in hot water at 60° C., and incapable of dissolving at 1% (w/v) in water at 20° C.:

(1)

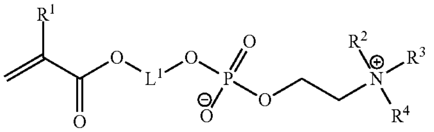

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

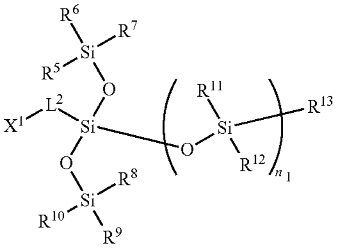

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

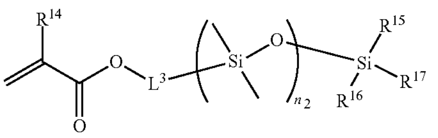

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

[Hydrophilic Monomer "a" ]

$R^1$ of the hydrophilic monomer "a" represented by the formula (1) represents a hydrogen atom or a methyl group, but preferably represents a methyl group from the viewpoint of raw material availability.

In addition, $L^1$ represents an organic group having 2 to 6 carbon atoms, and the organic group may optionally contain one ether bond and/or one hydroxy group, but $L^1$ represents preferably $—C_2H_4—$, $—C_2H_4—O—C_2H_4—$, or $—C_2H_5—$, particularly preferably $—C_2H_5—$, from the viewpoint of raw material availability.

Herein, the "organic group" is a group made up of elements like C, Si, N, P, O, and S, and may be a polymer having a repeating unit. In addition, the organic group may contain, in its structure, a group, such as a ketone group, an ester group, an ether group, a hydroxyl group, an amide group, a thioether group, or an isocyanurate group.

In addition, $R^2$ to $R^4$ each independently represent a hydrocarbon group having 1 to 3 carbon atoms, but preferably all represent methyl groups from the viewpoint of raw material availability.

Accordingly, a preferred specific example of the hydrophilic monomer "a" may be 2-methacryloyloxyethyl phosphorylcholine.

As the monomer "a" to be used in the present invention, a single monomer may be used, or a plurality of monomers may be used in combination.

[Silicone Monomer "b" ]

$X^1$ of the silicone monomer "b" in the case of being represented by the formula (2) represents any one polymerizable functional group that is a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group. Of those, a methacryloyloxy group is preferably selected from the viewpoint of raw material availability, and a 3-(2-hydroxyethyloxycarbonyl)-2-methylenepropanoyloxy group is preferably selected from the viewpoint of compatibility with the hydrophilic monomer.

In addition, $L^2$ represents an organic group having 2 to 6 carbon atoms, and the organic group may optionally contain one ether bond and/or one hydroxy group, but $-n-C_3H_6—$ is preferably selected from the viewpoint of raw material availability.

In addition, $R^5$ to $R^{13}$ each independently represent a methyl group or an ethyl group, but preferably all represent methyl groups from the viewpoint of raw material availability.

In addition, $n_1$, which represents 0 or 1, preferably represents 1 from the viewpoint of the fixation of the copolymer to the surface of a silicone hydrogel.

Accordingly, preferred specific examples of the monomer "b" represented by the formula (2) may include tris(trimethylsiloxy)silylpropyl methacrylate, 4-(2-hydroxyethyl)-2-methylene-1-(tris(trimethylsiloxy)silylpropyl)butane-1,4-dioate, and 3-(3-(methylbis(trimethylsiloxy)silyl)propyl) glycerol-1-methacrylate.

$R^{14}$ of the silicone monomer "b" in the case of being represented by the formula (3) represents a hydrogen atom or a methyl group, but preferably represents a methyl group from the viewpoint of the storage stability of the copolymer to be obtained.

In addition, $L^3$ represents an organic group having 2 to 6 carbon atoms, and the organic group may optionally contain one ether bond and/or one hydroxy group.

In addition, $n_2$ represents an integer of from 4 to 20. In addition, $n_2$ generally has a distribution, and in that case, the number-average value thereof preferably falls within the range of from 4 to 20.

In addition, $R^{15}$ to $R^{17}$ each independently represent an alkyl group having 1 to 8 carbon atoms.

Accordingly, preferred specific examples of the monomer "b" represented by the formula (3) may include polydimethylsiloxane monomethacrylate and one-terminal monomethacryloyloxypropyl-modified polydimethylsiloxane.

As the monomer "b" to be used in the present invention, a single monomer may be used, or a plurality of monomers may be used in combination. In addition, any one of the monomer represented by the formula (2) and the monomer represented by the formula (3) may be used alone, or both thereof may be used in combination.

The monomer represented by the formula (2) is preferably used alone from the viewpoint of the fixation to the surface of the silicone hydrogel.

[Ratio Between Monomer "a" and Monomer "b" ]

A ratio between the monomer "a" and the monomer "b" is preferably set to monomer "a":monomer "b"=from 5/1 to 300/1 (mass ratio), and is set to more preferably from 10/1 to 50/1, still more preferably from 20/1 to 50/1. When the ratio is set to fall within those ranges, the wettability- and lubricity-imparting effects of the copolymer on the silicone hydrogel are increased.

In addition, with respect to 100 parts by mass of the monomer "a", the monomer "b" may be used at from 0.3 part by mass to 20 parts by mass, preferably from 2 parts by mass to 10 parts by mass, more preferably from 2 parts by mass to 5 parts by mass.

In addition, the total ratio of the monomers "a" and "b" in all monomers to be used in the preparation of the copolymer of the present invention is set to preferably from 50 mol % to 100 mol %, more preferably from 80 mol % to 100 mol %. This is because the effect of the present invention is expressed in a preferred manner.

[Thermally Reactive Monomer or Photoreactive Monomer "c"]

The thermally reactive monomer or photoreactive monomer "c" has such reactivity induced by heating or photoirradiation that a copolymer obtained by copolymerizing the monomer "c" can form a carbon-carbon covalent bond between itself and an organic substance coexisting therewith.

A preferred specific example of the monomer "c" (thermally reactive monomer or photoreactive monomer "c") having reactivity induced by heating is glycidyl (meth) acrylate.

Preferred specific examples of the monomer "c" (thermally reactive monomer or photoreactive monomer "c") having reactivity induced by photoirradiation include 4-(meth)acryloyloxybenzophenone and 4-(4-azidobenzoyloxymethyl)styrene.

In addition, it is possible within the spirit of the present invention to utilize the reactivity of the monomer "c" described above to introduce a polymerizable functional group, such as a (meth)acrylic group or a vinyl group, through a polymer reaction after the synthesis of the copolymer.

The reactivity of the monomer "c" is preferably reactivity induced by photoirradiation. This is because the surface treatment of the silicone hydrogel can be more preferably performed.

A commercial product may be used as the monomer "c", or the monomer may be prepared by using such a method as disclosed in WO 2018/003821 A1.

A single monomer may be used as the thermally reactive monomer or photoreactive monomer "c" to be used in the present invention, or a plurality of monomers may be used in combination.

The ratio of the monomer "c" in all monomers to be used in the preparation of the copolymer of the present invention is set to preferably from 0 mol % to 50 mol %, more preferably from 0 mol % to 20 mol %. This is because the effect of the present invention is expressed in a preferred manner.

[Other Monomer "d" ]

The copolymer of the present invention may be a copolymer obtained by copolymerizing another monomer "d" to the extent that the effect of the present invention is not impaired.

The monomer "d" is preferably selected from monomers copolymerizable with the monomers "a", "b", and "c".

Preferred examples of such monomer include (meth) acrylic acid and derivatives thereof, (meth)acrylamide and derivatives thereof, and a vinyl compound.

Examples of the derivatives of (meth)acrylic acid include: alkyl (meth)acrylates, such as methyl (meth)acrylate and ethyl (meth)acrylate; and hydroxyalkyl (meth)acrylates, such as hydroxyethyl (meth)acrylate and hydroxypropyl (meth)acrylate.

Preferred examples of the (meth)acrylamide derivatives include dimethyl (meth)acrylamide and hydroxyethyl (meth)acrylamide.

Preferred examples of the vinyl compound include: hydroxyalkyl vinyl ethers, such as hydroxyethyl vinyl ether and hydroxybutyl vinyl ether; oligoethylene glycol monovinyl ethers such as diethylene glycol monovinyl ether; and pyrrolidone derivatives such as N-vinylpyrrolidone.

As the monomer "d", a single monomer may be used, or a plurality of monomers may be used in combination.

The ratio of the monomer "d" in all monomers to be used in the preparation of the copolymer of the present invention is preferably set to from 0 mol % to 10 mol %. This is because the effect of the present invention is expressed in a preferred manner.

[Production of Copolymer]

A known method, such as solution polymerization, bulk polymerization, emulsion polymerization, or suspension polymerization, may be used as a polymerization method for obtaining the copolymer of the present invention, and for example, a method such as radical polymerization, involving polymerizing the monomer "a", the monomer "b", the monomer "c", and as required, the monomer "d" in a solvent in the presence of a polymerization initiator, may be adopted.

Any generally used initiator may be used as the initiator to be used for the polymerization reaction, and for example, in the case of radical polymerization, an aliphatic azo compound, an organic peroxide, a persulfuric acid salt, or the like may be used. Examples of those polymerization initiators include 2,2'-azobis(isobutyronitrile), 2,2'-azobis(2,4-dimethylvaleronitrile), benzoyl peroxide, lauroyl peroxide, diisopropyl peroxydicarbonate, t-butyl peroxy-2-ethylhexanoate, t-butyl peroxypivalate, t-butyl peroxydiisobutyrate, potassium persulfate, and ammonium persulfate. Those polymerization initiators may be used as a mixture thereof. In addition, a redox-type radical promoter may be used with the polymerization initiator.

A polymerization temperature is preferably from 30° C. to 80° C., more preferably from 40° C. to 70° C. In addition, a polymerization time is preferably from 2 hours to 72 hours. This is because the polymerization reaction proceeds satisfactorily.

Further, a solvent may be used in order to smoothly perform the polymerization reaction, and examples of the solvent may include water, alcohols, such as methanol, ethanol, and propanol, benzene, toluene, dimethylformamide, tetrahydrofuran, dioxane, chloroform, and mixed solvents thereof.

[Molecular Weight of Copolymer]

The weight-average molecular weight of the copolymer of the present invention is set to preferably from 10,000 to 2,000,000, more preferably from 10,000 to 500,000, still more preferably from 100,000 to 200,000. When the weight-average molecular weight is set to fall within those ranges, wettability and lubricity can be imparted to the surface of a silicone hydrogel in a preferred manner.

The weight-average molecular weight of the copolymer of the present invention is determined, for example, in terms of polyethylene glycol through gel permeation chromatography (GPC) measurement using an EcoSEC system (manufactured by Tosoh Corporation).

[Water Solubility of Copolymer]

The copolymer of the present invention is capable of dissolving at 0.5% (w/v) in hot water at 60° C., and incapable of dissolving at 1% (w/v) in water at 20° C.

When the copolymer has such a high level of water solubility as to be capable of dissolving at 1% (w/v) or more in water at 20° C., the copolymer may have a low affinity for the surface of the silicone hydrogel having high hydrophobicity to preclude suitable surface treatment. In addition, when the copolymer has such a low level of water solubility as to be incapable of dissolving at 0.5% (w/v) in hot water, there is a high risk in that its wettability-imparting effect on the silicone hydrogel is impaired.

The water solubility of the copolymer of the present invention may be easily evaluated by, for example, such a procedure as described below.

(1) An appropriate amount of the copolymer is weighed in a hermetically sealable heat-resistant container. An example of such container is a glass vacuum vial.

(2) Pure water is added to the container so as to adjust the concentration of the copolymer to a predetermined concentration. For example, when the concentration is adjusted to 5.0% (w/v), 10 mL of pure water is added with respect to 0.5 g of the copolymer.

(3) The mixture is stirred under the condition of 20° C., and solubility is visually determined.

(4) The mixture is stirred while being warmed at 60° C. for 30 minutes, and its temperature is returned to room temperature, followed by the visual determination of the solubility of the copolymer (solubility in hot water).

As used herein, the term "dissolve" refers to a state in which, under visual observation, all of the copolymer loaded mixes uniformly with water, and hence no insoluble matter, turbidness, or stagnation can be visually recognized.

The water solubility of the copolymer of the present invention is positively correlated with the value of the monomer "a"/monomer "b" ratio (mass ratio) of the copolymer, and is negatively correlated with the weight-average molecular weight of the copolymer.

In view of the foregoing, a water solubility index (WSI) may be defined as shown in the following equation (4).
Monomer
Mass Ratio
Weight-Average Molecular Weight $$WSI \equiv \frac{\text{monomer } a}{\text{monomer } b}\,[\text{Mass ratio}] \times \frac{1000}{\text{Weight-average molecular weight}} \times 10^3 \quad (4)$$

The above-mentioned WSI is preferably 5 or more and 1,000 or less, and is set to more preferably 9 or more and 700 or less, still more preferably 20 or more and 300 or less.

When the WSI falls within the above-mentioned ranges, a copolymer having a preferred level of water solubility is easily obtained.

[Surface Treatment Method Including Using Copolymer of the Present Invention]

Another mode of the present invention is a surface-treated silicone hydrogel whose surface has been treated with the copolymer of the present invention.

More specifically, the other mode is a silicone hydrogel obtained by a method of treating the surface of a silicone hydrogel, the method including: (step A) a step of immersing the silicone hydrogel in a solution containing 0.5 wt % or more of the copolymer of the present invention; and (step B) a step of fixing the copolymer to the surface of the silicone hydrogel.

[Step A]

The solution containing 0.5 wt % or more of the copolymer of the present invention, which is used in the step A, may be easily prepared by, for example, a method including mixing the copolymer of the present invention with an appropriate solvent and stirring the mixture at an appropriate temperature.

The solvent to be used in the preparation of the solution may be arbitrarily selected from solvents that can dissolve the copolymer of the present invention and do not break the silicone hydrogel to be subjected to the surface treatment, and preferred examples thereof may include water, methanol, ethanol, propanol (n-propanol or iso-propanol), toluene, hexane, and a mixed solvent thereof.

The solvent to be used in the preparation of the solution may contain any other component to the extent that the effect of the present invention is not impaired. Examples of such component include, but not limited thereto: sodium chloride, potassium chloride, magnesium chloride, sodium dihydrogen phosphate, disodium hydrogen phosphate, potassium dihydrogen phosphate, and dipotassium hydrogen phosphate; salts, such as a boric acid salt, a sulfuric acid salt, and a hydrochloric acid salt; organic bases, such as triethylamine and trishydroxymethylaminomethane; organic acids, such as acetic acid and citric acid; sugars, such as glucose, sucrose, and hydroxypropyl methylcellulose; enzymes, such as lysozyme, protease, and catalase; surfactants, such as polyoxyethylene coconut oil fatty acid monoethanolamide sulfate, lauramidopropyl betaine, a sorbitan fatty acid ester, and polyoxyethylene polyoxypropylene glycol; preservatives, such as benzalkonium chloride and polyhexamethylene biguanide; and water-soluble polymers such as polyethylene glycol.

In the step A, the step of immersing the silicone hydrogel in the solution containing the copolymer of the present invention may be performed by, for example, the following procedure: an appropriate amount of the solution containing the copolymer of the present invention is dispensed into a plastic container; and the silicone hydrogel of interest is immersed therein.

The step A may be performed at any stage after the curing of a silicone hydrogel composition (monomer composition). In addition, the step may also serve as, for example, a step of immersing the silicone hydrogel in the solvent to extract and remove its impurities, but is preferably performed after the purification of the silicone hydrogel.

[Step B]

The step B may be performed by subjecting the silicone hydrogel that has undergone the step A to heating or photoirradiation.

When the step B is based on heating, the step may be performed by, for example, autoclaving the silicone hydrogel that has undergone the step A.

In addition, when the step B is based on photoirradiation, the step may be performed by, for example, subjecting the silicone hydrogel that has undergone the step A to appropriate photoirradiation.

The step B is more preferably based on photoirradiation. This is because wettability and lubricity can be suitably imparted to the silicone hydrogel of interest.

The silicone hydrogel to be subjected to the step B may be left immersed in the solution containing the copolymer of the present invention used in the step A.

The step B, which may be performed at any stage after the step A, is preferably performed after (immediately after) the step A.

[Silicone Hydrogel]

The silicone hydrogel to be subjected to the surface treatment in the present invention may be prepared by using such a known method as disclosed in, for example, WO 2020/054711 A1.

In addition, the silicone hydrogel contains a constituent unit based on a silicone monomer and a constituent unit based on a hydrogel monomer, and examples of the silicone monomer may include the following monomers:

(meth)acrylates each having a trimethylsiloxy group, such as 3-[tris(trimethylsiloxy)silyl]propyl (meth)acrylate, 3-[bis(trimethylsiloxy)methylsilyl]propyl (meth)acrylate, and 3-[(trimethylsiloxy)dimethylsilyl]propyl (meth)acrylate;

(meth)acrylamides each having a trimethylsiloxy group, such as 3-[tris(trimethylsiloxy)silyl]propyl (meth)acrylamide, 3-[bis(trimethylsiloxy)methylsilyl]propyl (meth)acrylamide, and 3-[(trimethylsiloxy)dimethylsilyl]propyl (meth)acrylamide;

methyl (meth)acrylates each having a trimethylsiloxy group, such as [tris(trimethylsiloxy)silyl]methyl (meth) acrylate, [bis(trimethylsiloxy)methylsilyl]methyl (meth)acrylate, and [(trimethylsiloxy)dimethylsilyl]methyl (meth)acrylate;

methyl (meth)acrylamides each having a trimethylsiloxy group, such as [tris(trimethylsiloxy)silyl]methyl (meth) acrylamide, [bis(trimethylsiloxy)methylsilyl]methyl (meth)acrylamide, and [(trimethylsiloxy)dimethylsilyl] methyl (meth)acrylamide;

styrenes each having a trimethylsiloxy group, such as [tris(trimethylsiloxy)silyl]styrene, [bis(trimethylsiloxy)methylsilyl]styrene, and [(trimethylsiloxy)dimethylsilyl]styrene; and vinyl carbamates each having a trimethylsiloxy group, such as N-[3-[tris(trimethylsiloxy)silyl]propyl] vinyl carbamate, N-[3-[bis(trimethylsiloxy)methylsilyl]propyl] vinyl carbamate, and N-[3-[(trimethylsiloxy)dimethylsilyl]propyl] vinyl carbamate.

The surface treatment agent for an ophthalmic device of this description, which includes the copolymer of the present invention, and may include a compound that does not inhibit the impartment of wettability and lubricity to the silicone hydrogel, is preferably formed only of the copolymer of the present invention.

[Method of Treating Surface of Silicone Hydrogel]

The present invention also encompasses the following method of treating the surface of a silicone hydrogel.

A method of treating a surface of a silicone hydrogel including a step of treating the surface of the silicone hydrogel with the copolymer of the present invention.

The copolymer is a copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

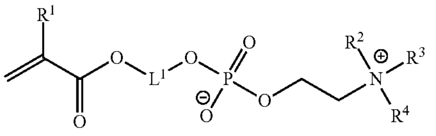

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

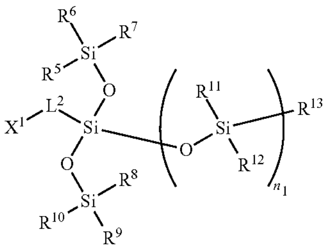

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

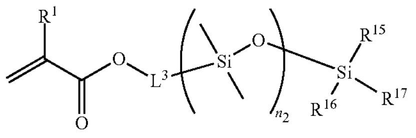

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

[Method of Producing Surface-Treated Silicone Hydrogel]

The present invention also encompasses a method of producing a surface-treated silicone hydrogel.

A method of producing a surface-treated silicone hydrogel, including a step of applying the copolymer of the present invention to a surface of a silicone hydrogel.

The copolymer is a copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

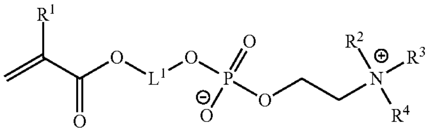

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

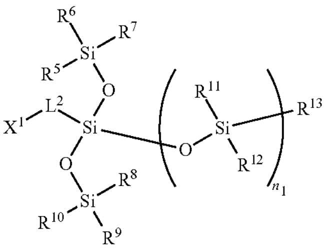

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

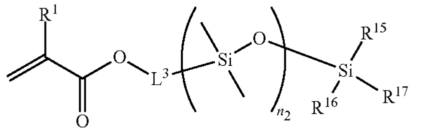

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

[Use of Copolymer of the Present Invention for Production of Surface Treatment Agent for Ophthalmic Device]

The present invention also encompasses a use of the following copolymer for production of a surface treatment agent for an ophthalmic device.

A copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", the copolymer being capable of dissolving at 0.5% (w/v) in hot water at 60° C., and incapable of dissolving at 1% (w/v) in water at 20° C.:

(1)

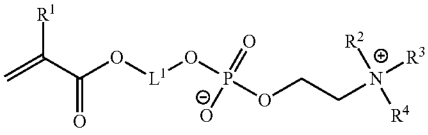

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

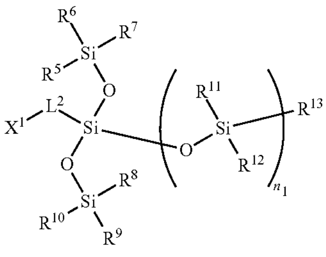

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

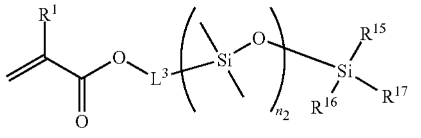

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

The combination of the constituent unit based on the hydrophilic monomer "a" represented by the formula (1), the constituent unit based on the silicone monomer "b" represented by the formula (2) or the formula (3), the constituent unit based on the thermally reactive monomer or photoreactive monomer "c", and/or the constituent unit based on the other monomer "d" in the copolymer of the present invention may be exemplified by those shown in Table 1 below.

In addition, a person skilled in the art can obtain copolymers containing various constituent units by appropriately changing the structures of the constituent units shown in Table 1.

In the surface treatment agent for an ophthalmic device of the present invention, the concentration of the copolymer of the present invention is preferably from 0.1 wt % to 5.0 wt %, and may be, for example, from 0.5 wt % to 3.0 wt %, from 1.0 wt % to 3.0 wt %, or from 1.5 wt % to 3.0 wt %.

EXAMPLES

The present invention is described in more detail below by way of Examples, but the present invention is not limited thereto.

[Synthesis of Copolymers]

For the synthesis of copolymers to be used for Examples, 9 kinds of copolymers shown in Table 1, that is, copolymers 1-1 to 2-3 falling within the scope of the present invention were synthesized.

Synthesis Example 1-1

19.3 Grams of 2-methacryloyloxyethyl phosphorylcholine (hereinafter referred to as "MPC"), 1.0 g of polydimethylsiloxane monomethacrylate (X-22-174AS-X manufactured by Shin-Etsu Chemical Co., Ltd., hereinafter referred to as "PDMSMA"), and 2.0 g of 4-methacryloyloxybenzophenone (hereinafter referred to as "MBP") (monomer composition molar ratio: MPC/PDMSMA/MBP=89/1/10) were weighed in a polymerization flask made of glass, and were dissolved by adding 88.9 g of n-propanol (hereinafter referred to as "NPA") serving as a polymerization solvent. After the inside of the reaction vessel had been sufficiently purged with nitrogen, a temperature in the vessel was increased to 60° C. 55 Milligrams of 2,2'-azobis(2,4-dimethylvaleronitrile) (hereinafter referred to as "ADVN") was added as a polymerization initiator to the vessel, and a polymerization reaction was performed by holding the temperature at 60° C. overnight without any treatment on the mixture. The resultant reaction liquid was dropped into a large excess of acetone to precipitate a polymer. The precipitate was separated by filtration, washed with acetone, and then vacuum-dried to provide the copolymer 1-1 as a white solid.

The weight-average molecular weight of the resultant copolymer 1-1 was determined to be 170,000 in terms of polyethylene glycol (hereinafter referred to as "PEG") through gel permeation chromatography (hereinafter referred to as "GPC") measurement.

Synthesis Example 1-2

21.0 Grams of MPC, 0.4 g of PDMSMA, and 2.1 g of MBP (monomer composition molar ratio: MPC/PDMSMA/MBP=89.5/0.5/10) were weighed in a polymerization flask made of glass, and were dissolved by adding 94.1 g of NPA serving as a polymerization solvent. After the inside of the reaction vessel had been sufficiently purged with nitrogen, a temperature in the vessel was increased to 60° C. 58 Milligrams of ADVN was added as a polymerization initiator to the vessel, and then polymerization and recovery were performed in the same manner as in Synthesis Example 1-1 to provide the copolymer 1-2 as a white solid. The weight-average molecular weight of the resultant copolymer 1-2 was determined to be 105,000 in terms of PEG through GPC measurement.

Synthesis Example 1-3

21.0 Grams of MPC, 0.4 g of PDMSMA, and 2.1 g of MBP (monomer composition molar ratio: MPC/PDMSMA/MBP=89.5/0.5/10) were weighed in a polymerization flask made of glass, and were dissolved by adding 35.3 g of NPA serving as a polymerization solvent. After the inside of the reaction vessel had been sufficiently purged with nitrogen, 6 mg of ADVN was added as a polymerization initiator to the vessel, and a temperature in the vessel was slowly increased to 60° C. A polymerization reaction was performed by holding the temperature at 60° C. overnight without any treatment on the mixture. Then, recovery was performed in the same manner as in Synthesis Example 1-1 to provide the copolymer 1-3 as a white solid.

The weight-average molecular weight of the resultant copolymer 1-3 was determined to be 951,000 in terms of PEG through GPC measurement.

Synthesis Example 1-4

18.4 Grams of MPC, 1.9 g of tris(trimethylsiloxy)silylpropyl methacrylate (hereinafter referred to as "TRIS"), and 2.0 g of MBP (monomer composition molar ratio: MPC/TRIS/MBP=84/6/10) were weighed in a polymerization flask made of glass, and were dissolved by adding 94.1 g of NPA serving as a polymerization solvent. After the inside of the reaction vessel had been sufficiently purged with nitrogen, a temperature in the vessel was increased to 60° C. 58 Milligrams of ADVN was added as a polymerization initiator to the vessel, and then polymerization and recovery were performed in the same manner as in Synthesis Example 1-1 to provide the copolymer 1-4 as a white solid.

The weight-average molecular weight of the resultant copolymer 1-4 was determined to be 72,000 in terms of PEG through GPC measurement.

Synthesis Example 1-5

20.2 Grams of MPC, 2.5 g of 4-(2-hydroxyethyl)-2-methylene-1-(tris(trimethylsiloxy)silylpropyl)butane-1,4-dioate (hereinafter referred to as "ETS"), and 2.3 g of 4-(4-azidobenzoyloxymethyl)vinylbenzene (hereinafter referred to as "AzSt") (monomer composition molar ratio: MPC/ETS/AzSt=84/6/10) were weighed in a polymerization flask made of glass, and were dissolved by adding 100.0 g of NPA serving as a polymerization solvent. After the inside of the reaction vessel had been sufficiently purged with nitrogen, 62 mg of ADVN was added as a polymerization initiator to the vessel, and then polymerization and recovery were performed in the same manner as in Synthesis Example 1-3 to provide the copolymer 1-5 as a white solid.

The weight-average molecular weight of the resultant copolymer 1-5 was determined to be 70,000 in terms of PEG through GPC measurement.

Synthesis Example 1-6

18.4 Grams of MPC, 1.9 g of 3-(3-(methylbis(trimethylsiloxy)silyl)propyl)glycerol-1-methacrylate (hereinafter referred to as "SiGMA"), and 2.0 g of MBP (monomer composition molar ratio: MPC/SiGMA/MBP=84/6/10) were weighed in a polymerization flask made of glass, and were dissolved by adding 88.9 g of NPA serving as a polymerization solvent. After the inside of the reaction vessel had been sufficiently purged with nitrogen, 55 mg of ADVN was added as a polymerization initiator to the vessel, and then polymerization and recovery were performed in the same manner as in Synthesis Example 1-3 to provide the copolymer 1-6 as a white solid.

The weight-average molecular weight of the resultant copolymer 1-6 was determined to be 74,000 in terms of PEG through GPC measurement.

Synthesis Example 2-1

20.7 Grams of MPC, 0.4 g of PDMSMA, and 1.1 g of glycidyl methacrylate (GMA) (monomer composition molar ratio: MPC/PDMSMA/GMA=89.5/0.5/10) were weighed in a polymerization flask made of glass, and were dissolved by adding 88.9 g of NPA serving as a polymerization solvent. After the inside of the reaction vessel had been sufficiently purged with nitrogen, 6 mg of ADVN was added as a polymerization initiator to the vessel, and then polymerization and recovery were performed in the same manner as in Synthesis Example 1-3 to provide the copolymer 2-1 as a white solid.

The weight-average molecular weight of the resultant copolymer 2-1 was determined to be 371,000 in terms of PEG through GPC measurement.

Synthesis Example 2-2

19.0 Grams of MPC, 2.1 g of TRIS, and 1.1 g of GMA (monomer composition molar ratio: MPC/TRIS/GMA=84/6/10) were weighed in a polymerization flask made of glass, and were dissolved by adding 88.9 g of NPA serving as a polymerization solvent. After the inside of the reaction vessel had been sufficiently purged with nitrogen, 55 mg of ADVN was added as a polymerization initiator to the vessel, and then polymerization and recovery were performed in the same manner as in Synthesis Example 1-3 to provide the copolymer 2-2 as a white solid.

The weight-average molecular weight of the resultant copolymer 2-2 was determined to be 72,000 in terms of PEG through GPC measurement.

Synthesis Example 2-3

20.5 Grams of MPC, 2.3 g of ETS, 1.2 g of GMA, and 1.1 g of hydroxyethylacrylamide (hereinafter referred to as "HEAA") (monomer composition molar ratio: MPC/ETS/

GMA/HEAA=76/5/9/10) were weighed in a polymerization flask made of glass, and were dissolved by adding 100.0 g of NPA serving as a polymerization solvent. After the inside of the reaction vessel had been sufficiently purged with nitrogen, 62 mg of ADVN was added as a polymerization initiator to the vessel, and then polymerization and recovery were performed in the same manner as in Synthesis Example 1-3 to provide the copolymer 2-3 as a white solid.

The weight-average molecular weight of the resultant copolymer 2-3 was determined to be 71,000 in terms of PEG through GPC measurement.

[GPC Measurement]

The GPC measurement of each of the copolymers of Synthesis Examples 1-1 to 2-3 described above was performed under the following conditions.

GPC system: EcoSEC system (manufactured by Tosoh Corporation)

Column: Shodex OHpak SB-802.5HQ (manufactured by Showa Denko K.K.) and SB-806HQ (manufactured by Showa Denko K.K.) connected in series Developing solvent: 20 mM sodium phosphate buffer (pH 7.4)

Detector: differential refractive index detector

Molecular weight standard: EasiVial PEG/PEO (manufactured by Agilent Technologies, Inc.)

Flow rate: 0.5 mL/min

Column temperature: 40° C.

Sample: the obtained copolymer diluted at a final concentration of 0.1 wt % with the developing solvent Injection volume: 100 μL

[Determination of Water Solubility]

Determination of the water solubility of each of the copolymers described in Synthesis Examples 1-1 to 2-3 described above was performed by the following procedure.

(1) An appropriate amount of each copolymer was weighed in a 30 cc glass vial so as to have a predetermined concentration described below.

(2) 10 mL of ion-exchanged water was added.

(3) The mixture was stirred at 20° C., and the solubility of the copolymer in water at room temperature was visually determined.

(4) After the mixture had been incubated in a thermostat at 60° C. for 1 hour, the mixture was stirred, and its temperature was returned to room temperature, followed by the visual determination of the solubility of the copolymer in hot water.

(5) The above-mentioned (1) to (4) were performed for each of concentrations of 0.1% (w/v), 0.5% (w/v), 1.0% (w/v), and 5.0% (w/v).

(6) For each of the water at room temperature (20° C.) and the hot water (60° C.), the maximum concentration at which the copolymer was determined to dissolve among the above-mentioned four concentrations was recorded. It should be noted that a case in which the copolymer did not dissolve even at 0.1% (w/v) was recorded as “x”.

The water solubility and weight-average molecular weight of each of the copolymers obtained in Synthesis Examples 1-1 to 2-3 described above are shown in Table 1.

TABLE 1

| | Kind of monomer (*1) | | | | Monomer ratio | | Weight-average molecular | Water solubility (*2) | |
|---|---|---|---|---|---|---|---|---|---|
| Synthesis procedure | Monomer "a" | Monomer "b" | Monomer "c" | Monomer "d" | a:b [mass ratio] | a:b:c:d [mol %] | weight [ $\times 10^3$ ] | Room temperature | Hot water |
| Synthesis Example 1-1 | MPC | PDMSMA | MBP | — | 22:1 | 89:1:10:0 | 170 | × | 0.5% |
| Synthesis Example 1-2 | MPC | PDMSMA | MBP | — | 45:1 | 89.5:0.5:10:0 | 105 | 0.1% | 1% |
| Synthesis Example 1-3 | MPC | PDMSMA | MBP | — | 45:1 | 89.5:0.5:10:0 | 951 | × | 0.5% |
| Synthesis Example 1-4 | MPC | TRIS | MBP | — | 10:1 | 84:6:10:0 | 72 | 0.5% | 1% |
| Synthesis Example 1-5 | MPC | ETS | AzSt | — | 10:1 | 84:6:10:0 | 70 | 0.5% | 1% |
| Synthesis Example 1-6 | MPC | SiGMA | MBP | — | 10:1 | 84:6:10:0 | 74 | 0.5% | 1% |
| Synthesis Example 2-1 | MPC | PDMSMA | GMA | — | 47:1 | 89.5:0.5:10:0 | 371 | × | 1% |
| Synthesis Example 2-2 | MPC | TRIS | GMA | — | 10:1 | 84:6:10:0 | 72 | 0.5% | 1% |
| Synthesis Example 2-3 | MPC | ETS | GMA | HEAA | 9:1 | 76:5:9:10 | 71 | 0.5% | 1% |

*1

MPC: 2-methacryloyloxyethyl phosphorylcholine

PDMSMA: polydimethylsiloxane monomethacrylate

MBP: methacryloyloxybenzophenone

TRIS: tris(trimethylsiloxy)silylpropyl methacrylate

ETS: 4-(2-hydroxyethyl)-2-methylene-1-(tris(trimethylsiloxy)silylpropyl)butane-1,4-dioate AzSt: 4-(4-azidobenzoyloxymethyl)vinylbenzene SiGMA: 3-(3-(methylbis(trimethylsiloxy)silyl)propyl)glycerol-1-methacrylate HEAA: hydroxyethyl acrylamide GMA: glycidyl methacrylate

*2

For each of room temperature (20° C.) and hot water (60° C.), the maximum concentration at which each copolyer dissolved is shown (unit: % (w/v). It should be noted that a copolymer that did not dissolve at 0.1% (w/v) is indicated as "x". The copolymers 1-1 to 2-3 were each determined to be incapable of dissolving at 1.0% (w/v) in water at 20° C., and capable of dissolving at 0.5% (w/v) or more in hot water.

[Preparation of Silicone Hydrogel]

Respective silicone hydrogels to be used in Examples and Comparative Examples were each prepared by a method including the following steps 1 to 6, and A and B.

[Step 1: Preparation of Monomer Composition]

Respective monomers were mixed at respective blending ratios shown in Table 2 to prepare monomer compositions. At this time, the preparation was performed by: weighing and mixing predetermined amounts of NPA and hydroxyethyl methacrylate (hereinafter referred to as "HEMA"), and MPC in the case of a monomer composition MC4; then adding predetermined amounts of N-vinylpyrrolidone (hereinafter referred to as "NVP"), tetraethylene glycol dimethacrylate (hereinafter referred to as "TEGDMA"), and triethylene glycol divinyl ether (hereinafter referred to as "TEGDV"), and methacrylic acid (hereinafter referred to as "MA") in the case of a monomer composition MC2 or aminoethyl methacrylate (hereinafter referred to as "AeMA") in the case of a monomer composition MC3 to the mixture, followed by mixing again; adding ETS to the mixture, followed by mixing yet again; adding PDMSMA to the mixture, followed by mixing still yet again; and finally adding AIBN as a reaction initiator to the mixture.

[Step 2: Curing of Monomer Composition]

In order to mold each of the above-mentioned monomer compositions into a disc shape as a contact lens model, the monomer compositions were each poured into a mold made of polypropylene having inside dimensions of φ1.1 cm×0.1 mm, and the mold was left at rest in an oven. After the inside of the oven had been purged with nitrogen, thermal curing was performed by slowly increasing the temperature to 80° C. and holding the temperature at 80° C. for 12 hours, to thereby provide a cured product.

[Step 3: Alcohol Extraction Purification]

The cured product prepared in the step 2 was removed from the mold, and each cured product was subjected to purification involving removing impurities and the like by being immersed in 40 g of iso-propanol (hereinafter referred to as "IPA") for 4 hours.

[Step 4: Water Extraction Purification]

The cured product that had undergone the step 3 was subjected to purification involving extracting and removing impurities, unreacted substances, and the like by being immersed in 50 g of ion-exchanged water (or a treatment liquid containing ion-exchanged water (pure water) as a solvent when the step also served as the step A) for 4 hours.

[Step 5: Physiological Saline Substitution]

The cured product that had undergone the step 4 was removed, and was hydrated and swollen by being immersed in physiological saline (hereinafter referred to as "PBS") described in ISO-18369-3 (or a treatment liquid containing the PBS as a solvent when the step also served as the step A) for 4 hours.

[Step 6: High-pressure Steam Sterilization]

The cured product that had undergone the step 5 was immersed in fresh PBS, and a container containing the cured product and the PBS was hermetically sealed, followed by sterilization through autoclaving at 121° C. for 20 minutes.

TABLE 2

| Monomer composition | | MC1 | MC2 | MC3 | MC4 |
|---|---|---|---|---|---|
| Composition [part(s) by weight] | MPC | — | — | — | 0.85 |
| | NPA | 12.7 | | | |
| | HEMA | 16.9 | | | |
| | NVP | 33.8 | | | |
| | TEGDMA | 0.7 | | | |
| | TEGDV | 1.7 | | | |
| | MA | — | 0.02 | — | — |
| | AeMA | — | — | 0.32 | — |
| | ETS | 12.7 | | | |
| | PDMSMA | 21.1 | | | |
| | AIBN | 0.4 | | | |
| | Total | 100.0 | 100.0 | 100.3 | 100.9 |

*

MPC: 2-methacryloyloxyethyl phosphorylcholine
NPA: n-propanol
HEMA: hydroxyethyl methacrylate
NVP: N-vinylpyrrolidone
TEGDMA: tetraethylene glycol dimethacrylate
TEGDV: triethylene glycol divinyl ether
MA: methacrylic acid
AeMA: aminoethyl methacrylate (11 wt % aqueous solution)
ETS: 4-(2-hydroxyethyl)-2-methylene-1-(tris(trimethylsiloxy)silylpropyl)butane-1,4-dioate
PDMSMA: polydimethylsiloxane monomethacrylate
AIBN: 2,2'-azobis (isobutyronitrile)

[Surface Treatment]

[Preparation of Treatment Liquid]

Respective treatment liquids each having composition shown in Table 4 were prepared.

The treatment liquids were prepared by dissolving predetermined concentrations of the respective copolymers 1-1 to 2-3 of the present invention in predetermined solvents shown in Table 4. At this time, heating was appropriately performed in accordance with the solubility of each of the copolymers.

[Surface Treatment Step]

[Step A]

Cured products obtained by curing the respective monomer compositions were immersed in the prepared treatment liquids, and were each left at rest at room temperature for a predetermined time period.

[Step B (Light)]

The step B based on photoirradiation was performed by irradiating each of the cured products that had undergone the step A with light having a wavelength of 365 nm or 405 nm and an irradiance of 1.5 $mW/cm^2$ for 20 minutes. At this time, the cured product was left immersed in the corresponding treatment liquid.

When the step B served as the final step in the preparation of a silicone hydrogel, after the photoirradiation, the resultant surface-treated cured product was rinsed with 10 mL of fresh PBS three times.

[Step B (Heat)]

The step B based on heating was performed by: immersing each of the cured products that had undergone the step A in fresh PBS; hermetically sealing a container containing the cured product and the PBS; and autoclaving the container at 121° C. for 20 minutes.

[Order of Respective Steps]

The order in which the steps 1 to 6, and the steps A and B were performed followed each of schemes shown in Table 3.

TABLE 3

| Scheme 1 | Scheme 2 | Scheme 3 |
|---|---|---|
| Step 1 | Step 1 | Step 1 |
| ↓ | ↓ | ↓ |
| Step 2 | Step 2 | Step 2 |
| ↓ | ↓ | ↓ |
| Step 3 | Step 3 | Step 3 |
| ↓ | ↓ | ↓ |
| Step 4 | Step 4 = Step A | Step 4 |
| ↓ | ↓ | ↓ |
| Step 5 | Step B | Step 5 = Step A |
| ↓ | ↓ | ↓ |
| Step 6 | Step 5 | Step 6 = Step B |
| ↓ | ↓ | |
| Step A | Step 6 | |
| ↓ | | |
| Step B | | |

*

Step 1: preparation of the monomer composition

Step 2: curing of the monomer composition

Step 3: alcohol extraction purification

Step 4: water extraction purification

Step 5: physiological saline substitution

Step 6: high-pressure steam sterilization

Step A: immersion of the cured product in a solution of the copolymer of the present invention (in the case of each of Comparative Examples, the immersion of the cured product only in a solvent)

Step B: step of subjecting the cured product to heating treatment or photoirradiation treatment to fix the copolymer of the present invention to the surface of the cured product (in the case of each of Comparative Examples, the step of subjecting the cured product to heating treatment or photoirradiation treatment)

=: the steps arranged in parallel with each other mean that one step serving as the two steps was performed.

[Evaluations]

The surface-treated cured products obtained by the above-mentioned procedure were evaluated by the following methods.

[Transparency]

The transparency of the prepared silicone hydrogel was visually determined by the following criteria.

++: Transparent

+: Slightly turbid x: Clouded

[Shape]

The shape of the prepared silicone hydrogel was visually evaluated by the following criteria.

++: No distortion is found.

+: Slight distortion is found.

x: Distortion and curing failure are found.

[Wettability]

The surface wettability of the prepared silicone hydrogel was evaluated by the following procedure.

(1) The prepared silicone hydrogel immersed in PBS was taken out into the air using tweezers.

(2) The surface of the silicone hydrogel was visually observed, and a period of time between its being taken out and the start of breakage of a water film on the surface [seconds] (BUT) was measured. That is, evaluation was performed on the assumption that a longer BUT indicated higher surface wettability.

(3) Determination was performed in accordance with the following criteria.

+++: 30 seconds BUT

++: 10 seconds BUT<30 seconds

+: 5 seconds BUT<10 seconds x: BUT<5 seconds

[Lubricity]

The surface lubricity of the prepared silicone hydrogel was evaluated by the following procedure.

(1) The silicone hydrogel lens was picked up with a thumb and a middle finger.

(2) A score of from 0 points to 10 points was given through sensory evaluation with the lubricity of Polymacon being defined as 2 points and the lubricity of Omafilcon A being defined as 8 points. That is, a higher score indicates higher lubricity.

(3) Determination was performed in accordance with the following criteria.

+++: From 7 points to 10 points

++: 5 points or 6 points

+: 3 points or 4 points x: From 0 points to 2 points

Examples 1-1 to 1-5

The surface treatment of a cured product was performed by using, as the copolymer of the present invention, each of the copolymers 1-1 to 1-3 each containing MPC, PDMSMA, and MBP as its constituent monomers. Herein, the surface treatment was performed by: immersing the cured product that had undergone the steps 1 to 6 in a treatment liquid at room temperature for 1 hour (step A); and irradiating the cured product with light having a wavelength of 365 nm and an irradiance of 1.5 $mW/cm^2$ immediately after the immersion (step B). Finally, the evaluations were performed.

Examples 1-6 to 1-8

The same surface treatment and evaluations as those of Examples 1-1 to 1-5 were performed by using each of the copolymers 1-4 to 1-6 as the copolymer of the present invention.

Example 1-9

An investigation was made on a case in which the surface treatment of a cured product was performed by using the copolymer 1-4 while setting the wavelength of the light to be applied to the cured product in the step B to 405 nm.

Example 2-1

A cured product that had undergone the steps 1 to 3 was subjected to water extraction purification with pure water having added thereto 1 wt % of the copolymer of the present invention, the purification serving as the step 4 and the step A. Immediately after that, the cured product was irradiated with light having a wavelength of 365 nm and an irradiance of 1.5 $mW/cm^2$, and then the steps 5 and 6 were performed, followed by its evaluations.

Examples 3-1 to 4-2

An investigation was made on the following case: each of cured products that had undergone the steps 1 to 4 was subjected to physiological saline substitution with PBS having added thereto 0.5 wt % of the copolymer of the present invention, the purification serving as the step 5 and the step A; and the cured product was transferred to fresh PBS, and was subjected to high-pressure steam sterilization serving as the step 6 and the step B.

With regard to each of Examples described above, the number of the monomer composition that provided the used cured product, the composition of the treatment liquid, the order in which the respective steps were performed, a method of performing the step B, and the evaluation results of the resultant surface-treated cured product are summarized in Table 4.

TABLE 4

| Example | | | 1-1 | 1-2 | 1-3 | 1-4 | 1-5 | 1-6 | 1-7 | 1-8 | 1-9 |
|---|---|---|---|---|---|---|---|---|---|---|---|
| Monomer composition that provided cured product | | | MC1 | | | | | | | | |
| Copolymer of the present invention | Copolymer | | 1-1 | | | 1-2 | 1-3 | 1-4 | 1-5 | 1-6 | 1-4 |
| | Constituent monomer (*1) | monomer "a" | MPC | | | | | MPC | MPC | MPC | MPC |
| | | monomer "b" | PDMSMA | | | | | TRIS | ETS | SiGMA | TRIS |
| | | monomer "c" | MBP | | | | | MBP | AzSt | MBP | MBP |
| | | monomer "d" | — | | | | | — | — | — | — |
| | Monomer "a"/monomer "b" [mass ratio] | | 22/1 | | | 45/1 | | 10/1 | 10/1 | 10/1 | 10/1 |
| | Weight-average molecular weight [x10$^3$] | | 170 | | | 105 | 951 | 72 | 70 | 74 | 72 |
| | Water solubility (*2) | Hot water, 0.5% (w/v) | ++ | | | ++ | ++ | ++ | ++ | ++ | ++ |
| | | Room temperature, 1% (w/v) | × | | | × | × | × | × | × | × |
| Treatment liquid composition | Copolymer concentration [wt %] | | 0.5% | 1.0% | 2.0% | 0.5% | 0.5% | 0.5% | 0.5% | 0.5% | 0.5% |
| | Solvent (*3) | | PBS | | | | | | | | |
| Surface treatment method | Order of respective steps | | Scheme 1 | | | | | | | | |
| | Method for step B | | Photoirradiation (365 nm) | | | | | | | | Photoirradiation (405 nm) |
| Evaluation result | Transparency | | ++ | ++ | ++ | ++ | ++ | ++ | ++ | ++ | ++ |
| | Shape | | ++ | ++ | ++ | ++ | ++ | ++ | ++ | ++ | ++ |
| | Wettability (BUT [sec]) | | +++ (30<) | +++ (30) | +++ (30<) | +++ (30<) | +++ (30) | +++ (30<) | +++ (30) | ++ (20) | +++ (30) |
| | Lubricity (score [point(s)]) | | ++ (6) | +++ (7) | +++ (7) | ++ (6) | +++ (7) | ++ (6) | ++ (5) | ++ (5) | ++ (6) |

| Example | | | 2-1 | 3-1 | 3-2 | 3-3 | 4-1 | 4-2 |
|---|---|---|---|---|---|---|---|---|
| Monomer composition that provided cured product | | | MC1 | MC1 | | | MC2 | MC3 |
| Copolymer of the present invention | Copolymer | | 1-4 | 2-1 | 2-2 | 2-3 | 2-2 | |
| | Constituent monomer (*1) | monomer "a" | MPC | MPC | MPC | MPC | MPC | |
| | | monomer "b" | TRIS | PDMSMA | TRIS | ETS | TRIS | |
| | | monomer "c" | MBP | GMA | GMA | GMA | GMA | |
| | | monomer "d" | — | — | — | HEAA | — | |
| | Monomer "a"/monomer "b" [mass ratio] | | 10/1 | 47/1 | 10/1 | 9/1 | 10/1 | |
| | Weight-average molecular weight [x10$^3$] | | 72 | 371 | 72 | 71 | 72 | |
| | Water solubility (*2) | Hot water, 0.5% (w/v) | ++ | ++ | ++ | ++ | ++ | |
| | | Room temperature, 1% (w/v) | × | × | × | × | × | |
| Treatment liquid composition | Copolymer concentration [wt %] | | 1.0% | 0.5% | 0.5% | 0.5% | 0.5% | |
| | Solvent (*3) | | Pure water | PBS | PBS | PBS | PBS | |
| Surface treatment method | Order of respective steps (*4) | | Scheme 2 | Scheme 3 | | | | |
| | Method for step B | | Photoirradiation (365 nm) | Heating | | | | |
| Evaluation result | Transparency | | ++ | ++ | ++ | ++ | ++ | ++ |
| | Shape | | ++ | ++ | ++ | ++ | ++ | ++ |
| | Wettability (BUT [sec]) | | +++ (30) | +++ (30<) | +++ (30<) | +++ (30<) | +++ (30) | ++ (15) |
| | Lubricity (score [point(s)]) | | ++ (5) | ++ (6) | ++ (5) | ++ (5) | ++ (5) | ++ (5) |

*1

MPC: 2-methacryloyloxyethyl phosphorylcholine

PDMSMA: polydimethylsiloxane monomethacrylate

MBP: 4-methacryloyloxybenzophenone

TRIS: tris(trimethylsiloxy)silylpropyl methacrylate

ETS: 4-(2-hydroxyethyl)-2-methylene-1-(tris(trimethylsiloxy)silylpropyl)butane-1,4-dioate AzSt: 4-(4-azidobenzoyloxymethyl)vinylbenzene SiGMA: 3-(3-(methylbis(trimethylsiloxy)silyl)propyl)glycerol-1-methacrylate GMA: glycidyl methacrylate HEAA: hydroxyethyl acrylamide

*2

Under each of the conditions of 0.5% (w/v) in hot water and 1% (w/v) at room temperature, a case in which water solubility was found was marked with Symbol "○", and a case in which water solubility was not found was marked with Symbol "x".

*3

PBS: physiological saline described in ISO-18369-3

NPA: n-propanol

Comparative Examples 1-1 to 2-3

As control tests in each of which the copolymer of the present invention was not used, 6 kinds of surface-treated cured products shown in Table 5 were prepared by the same methods as those of Examples, and were evaluated by the same methods as those of Examples.

Comparative Example 3-1

Evaluations were performed in a case in which surface treatment including using the copolymer of the present invention was not performed, and a method including adding a MPC monomer to a monomer composition was adopted.

TABLE 5

| Comparative Example | | | 1-1 | 1-2 | 1-3 | 2-1 | 2-2 | 2-3 | 3-1 |
|---|---|---|---|---|---|---|---|---|---|
| Monomer composition that provided cured product | | | MC1 | | MC1 | MC1 | MC2 | MC3 | MC4 |
| Copolymer of the present invention | Copolymer | | — | — | — | — | | | — |
| | Constituent monomer (*1) | monomer "a" | — | — | — | — | | | — |
| | | monomer "b" | — | — | — | — | | | — |
| | | monomer "c" | — | — | — | — | | | — |
| | | monomer "d" | — | — | — | — | | | — |
| | Monomer "a"/monomer "b" [mass ratio] | | — | — | — | — | | | — |
| | Weight-average molecular weight [×10³] | | — | — | — | — | | | — |
| | Water solubility (*2) | Hot water, 0.5% (w/v) | — | — | — | — | | | — |
| | | Room temperature, 1% (w/v) | — | — | — | — | | | — |
| Treatment liquid composition | Copolymer concentration [wt %] | | — | — | — | — | | | — |
| | Solvent (*3) | | PBS | | Pure water | PBS | | | — |
| Surface treatment method | Order of respective steps (*4) | | Scheme 1 | | Scheme 2 | Scheme 3 | | | — |
| | Method for step B | | Photoirradiation (365 nm) | Photoirradiation (405 nm) | Photoirradiation (365 nm) | Heating | | | — |
| Evaluation result | Transparency | | ++ | ++ | ++ | ++ | ++ | ++ | ++ |
| | Shape | | ++ | ++ | ++ | ++ | ++ | ++ | ++ |
| | Wettability (BUT [sec]) | | × (<1) | × (2) | × (3) | × (1) | + (5) | +++ (30<) | + (5) |
| | Lubricity (score [point(s)]) | | × (0) | × (0) | × (2) | × (0) | × (0) | × (0) | ++ (5) |

As apparent from the results of Table 4 and Table 5, the silicone hydrogels of Examples 1-1 to 4-2 each showed excellent transparency and an excellent shape property, and each showed excellent wettability and excellent lubricity simultaneously, whereas in each of Comparative Examples 1-1 to 2-3, any one or both of the wettability and the lubricity were low because the copolymer of the present invention was not incorporated. The composition of Comparative Example 3-1 was a conventional lens composition blended with the MPC monomer, and was inferior in wettability to the silicone hydrogels of Examples 1-1 to 4-2 because the composition was not subjected to any surface treatment with the copolymer of the present invention. As described above, in the surface treatment including using the copolymer of the present invention, even when a silicone hydrogel is not caused to present any specific complementary functional group, the wettability and lubricity of the silicone hydrogel can be suitably improved by fixing the copolymer of the present invention to the surface of the silicone hydrogel.

INDUSTRIAL APPLICABILITY

An ophthalmic device, such as a contact lens, an intraocular lens, or an artificial cornea, can be provided by using a silicone hydrogel obtained by a method of treating the surface of a silicone hydrogel with the copolymer of the present invention.

The invention claimed is:

1. A method of treating a surface of a silicone hydrogel, including a step of treating the surface of the silicone hydrogel with a copolymer, the copolymer containing: a constituent unit based on a hydrophilic monomer “a” represented by the following formula (1); a constituent unit based on a silicone monomer “b” represented by the following formula (2) or the following formula (3); and a constituent unit based on a thermally reactive monomer or photoreactive monomer “c”, wherein the constituent unit based on the thermally reactive monomer or photoreactive monomer “c” is methacryloyloxybenzophenone, 4-(4-azidobenzoyloxymethyl) vinylbenzene, or glycidyl methacrylate, and the copolymer is capable of dissolving at 0.5% (w/v) in hot water at 60° C., and incapable of dissolving at 1% (w/v) in water at 20° C.:

(1)

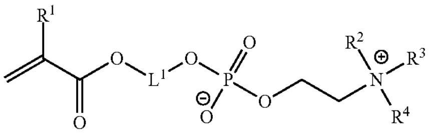

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

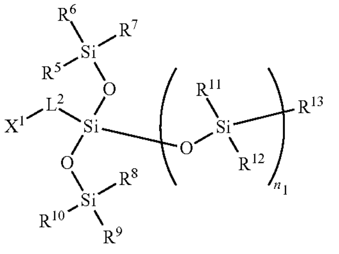

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

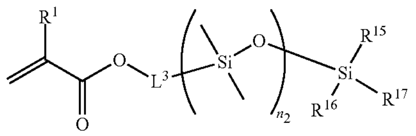

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

2. The method of treating a surface of a silicone hydrogel according to claim 1, wherein the constituent unit based on the hydrophilic monomer "a" represented by the formula (1) is 2-methacryloyloxyethyl phosphorylcholine, and the constituent unit based on the silicone monomer "b" represented by the formula (2) or the formula (3) is polydimethylsiloxane monomethacrylate, tris(trimethylsiloxy) silylpropyl methacrylate, 4-(2-hydroxyethyl)-2-methylene-1-(tris(trimethylsiloxy) silylpropyl) butane-1,4-dioate, or 3-(3-(methylbis(trimethylsiloxy) silyl) propyl)glycerol-1-methacrylate.

3. The method of treating a surface of a silicone hydrogel according to claim 2, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is any one selected from the following:

(1) 2-methacryloyloxyethyl phosphorylcholine, polydimethylsiloxane monomethacrylate, and methacryloyloxybenzophenone;

(2) 2-methacryloyloxyethyl phosphorylcholine, tris(trimethylsiloxy) silylpropyl methacrylate, and methacryloyloxybenzophenone;

(3) 2-methacryloyloxyethyl phosphorylcholine, 4-(2-hydroxyethyl)-2-methylene-1-(tris(trimethylsiloxy) silylpropyl) butane-1,4-dioate, and 4-(4-azidobenzoyloxymethyl) vinylbenzene;

(4) 2-methacryloyloxyethyl phosphorylcholine, 3-(3-(methylbis(trimethylsiloxy) silyl) propyl)glycerol-1-methacrylate, and methacryloyloxybenzophenone;

(5) 2-methacryloyloxyethyl phosphorylcholine, polydimethylsiloxane monomethacrylate, and glycidyl methacrylate;

(6) 2-methacryloyloxyethyl phosphorylcholine, tris(trimethylsiloxy) silylpropyl methacrylate, and glycidyl methacrylate; and (7) 2-methacryloyloxyethyl phosphorylcholine, 4-(2-hydroxyethyl)-2-methylene-1-(tris(trimethylsiloxy) silylpropyl) butane-1,4-dioate, and glycidyl methacrylate.

4. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, polydimethylsiloxane monomethacrylate, and methacryloyloxybenzophenone.

5. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, tris(trimethylsiloxy) silylpropyl methacrylate, and methacryloyloxybenzophenone.

6. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, 4-(2-hydroxyethyl)-2-methylene-1-(tris(trimethylsiloxy) silylpropyl) butane-1,4-dioate, and 4-(4-azidobenzoyloxymethyl) vinylbenzene.

7. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, 3-(3-(methylbis(trimethylsiloxy) silyl) propyl)glycerol-1-methacrylate, and methacryloyloxybenzophenone.

8. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, polydimethylsiloxane monomethacrylate, and glycidyl methacrylate.

9. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, tris(trimethylsiloxy) silylpropyl methacrylate, and glycidyl methacrylate.

10. The method of treating a surface of a silicone hydrogel according to claim 1, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is the following:

2-methacryloyloxyethyl phosphorylcholine, 4-(2-hydroxyethyl)-2-methylene-1-(tris(trimethylsiloxy) silylpropyl) butane-1,4-dioate, and glycidyl methacrylate.

11. A method of producing a surface-treated silicone hydrogel, including a step of applying a copolymer to a surface of a silicone hydrogel, the copolymer containing: a constituent unit based on a hydrophilic monomer "a" represented by the following formula (1); a constituent unit based on a silicone monomer "b" represented by the following formula (2) or the following formula (3); and a constituent unit based on a thermally reactive monomer or photoreactive monomer "c", wherein the constituent unit based on the thermally reactive monomer or photoreactive monomer "c" is methacryloyloxybenzophenone, 4-(4-azidobenzoyloxymethyl) vinylbenzene, or glycidyl methacrylate, and the copolymer is capable of dissolving at 0.5% (w/v) in hot water at 60° C., and incapable of dissolving at 1% (w/v) in water at 20° C.:

(1)

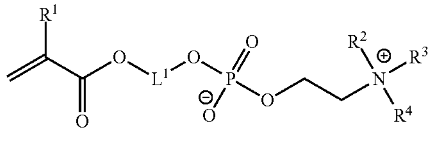

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

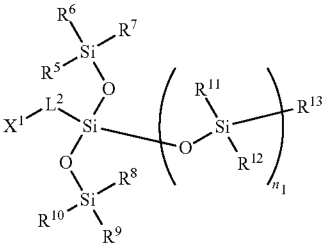

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

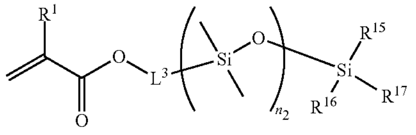

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

12. The method of producing a surface-treated silicone hydrogel according to claim 11, wherein the constituent unit based on the hydrophilic monomer "a" represented by the formula (1) is 2-methacryloyloxyethyl phosphorylcholine, and the constituent unit based on the silicone monomer "b" represented by the formula (2) or the formula (3) is polydimethylsiloxane monomethacrylate, tris(trimethylsiloxy) silylpropyl methacrylate, 4-(2-hydroxyethyl)-2-methylene-1-(tris(trimethylsiloxy) silylpropyl) butane-1,4-dioate, or 3-(3-(methylbis(trimethylsiloxy) silyl) propyl)glycerol-1-methacrylate.

13. The method of producing a surface-treated silicone hydrogel according to claim 11, wherein a combination of the constituent unit based on the hydrophilic monomer "a" represented by the formula (1), the constituent unit based on the silicone monomer "b" represented by the formula (2) or the formula (3), and the constituent unit based on the thermally reactive monomer or photoreactive monomer "c" is any one selected from the following:

(1) 2-methacryloyloxyethyl phosphorylcholine, polydimethylsiloxane monomethacrylate, and methacryloyloxybenzophenone;

(2) 2-methacryloyloxyethyl phosphorylcholine, tris(trimethylsiloxy) silylpropyl methacrylate, and methacryloyloxybenzophenone;

(3) 2-methacryloyloxyethyl phosphorylcholine, 4-(2-hydroxyethyl)-2-methylene-1-(tris(trimethylsiloxy) silylpropyl) butane-1,4-dioate, and 4-(4-azidobenzoyloxymethyl) vinylbenzene;

(4) 2-methacryloyloxyethyl phosphorylcholine, 3-(3-(methylbis(trimethylsiloxy) silyl) propyl)glycerol-1-methacrylate, and methacryloyloxybenzophenone;

(5) 2-methacryloyloxyethyl phosphorylcholine, polydimethylsiloxane monomethacrylate, and glycidyl methacrylate;

(6) 2-methacryloyloxyethyl phosphorylcholine, tris(trimethylsiloxy) silylpropyl methacrylate, and glycidyl methacrylate; and (7) 2-methacryloyloxyethyl phosphorylcholine, 4-(2-hydroxyethyl)-2-methylene-1-(tris(trimethylsiloxy) silylpropyl) butane-1,4-dioate, and glycidyl methacrylate.

* * * * *